US007584267B2

(12) United States Patent
Sane (10) Patent No.: US 7,584,267 B2
(45) Date of Patent: Sep. 1, 2009

(54) SCALABLE SPECIFICATION OF PAGE FLOWS

(75) Inventor: Aamod Sane, Fremont, CA (US)

(73) Assignee: Yahoo! Inc., Sunnyvale, CA (US)

( * ) Notice: Subject to any disclaimer, the term of this patent is extended or adjusted under 35 U.S.C. 154(b) by 577 days.

(21) Appl. No.: 11/209,399

(22) Filed: Aug. 22, 2005

(65) Prior Publication Data
US 2007/0043832 A1 Feb. 22, 2007

(51) Int. Cl.
*G06F 15/16* (2006.01)
(52) U.S. Cl. ......................... 709/218; 709/223
(58) Field of Classification Search ......... 709/200–203, 709/217–227, 228–229
See application file for complete search history.

(56) References Cited

U.S. PATENT DOCUMENTS

| 5,918,239 | A  | * | 6/1999  | Allen et al. ................. 715/210 |
| 6,915,279 | B2 | * | 7/2005  | Hogan et al. ................ 705/64  |
| 6,993,531 | B1 | * | 1/2006  | Naas .......................... 707/102 |
| 2002/0120714 | A1 | * | 8/2002  | Agapiev ..................... 709/218 |
| 2002/0123931 | A1 | * | 9/2002  | Splaver et al. ............... 705/14  |
| 2005/0256924 | A1 | * | 11/2005 | Chory et al. ................ 709/203 |
| 2006/0085492 | A1 | * | 4/2006  | Singh et al. ................. 707/203 |

OTHER PUBLICATIONS http://cocoon.apache.org/2.1/userdocs/flow/using.html "Advanced Control Flow—Using Cocoon's Control Flow," The Apache Software Foundation, Mar. 29, 2005.
http://cocoon.apache.org/2.1/userdocs/flow/index.html "Apache Cocoon—Control Flow," The Apache Software Foundation, Mar. 29, 2005.
http://cocoon.apache.org/2.1/userdocs/flow/tutor.html "Advanced Control Flow—Tutorial: A Gentle Introduction to Cococon Control Flow," The Apache Software Foundation, Mar. 29, 2005.
http://cocoon.apache.org/2.1/userdocs/flow/how-does-it-work.html "Advanced Control Flow—Cocoon and Continuations," The Apache Software Foundation, Mar. 29, 2005.
http://cocoon.apache.org/2.1/userdocs/flow/continuations.html "Advanced Control Flow—A Different Approach," The Apache Software Foundation, Mar. 29, 2005.
http://cocoon.apache.org/2.1/userdocs/flow/sitemap.html "Advanced Control Flow—Sitemap," The Apache Software Foundation, Mar. 29, 2005.

(Continued)

Primary Examiner—Moustafa M Meky
(74) Attorney, Agent, or Firm—Darby & Darby PC; John W. Branch (57) ABSTRACT

The invention enables a specification of a customized flow of pages for an interactive web application. Execution of page flows is differentiated from other aspects of execution. Instead of implementing continuations by using an entire procedure call stack, a separate, relatively small page flow stack is used to save state information relating to page flow. Additional resource economies may be achieved by analyzing a page flow processing program. In one embodiment, the invention is employed for expressing page flows associated with the checkout phase of an online store web application. An online store operator may define various kinds of common page flows that may then be provided to third-party merchants for use in customizing online store sites.

22 Claims, 8 Drawing Sheets

OTHER PUBLICATIONS http://www-128.ibm.com/developerworks/library/j-contin.html Belapurkar, A. (2004) "Use Continuations to Develop Complex Web Applications."

Predescu, O. et al. (1999-2005) "Advanced Control Flow," The Apache Software Foundation, pp. 1-17.

http://www.ibm.com/developerworks/library/j-contin.html; Belapurkar, A.; Use Continuations to Develop Complex Web Application: A Programming Paradigm to Simplify MVC for the Web; Dec. 21, 2004; printed Dec. 1, 2008; pp. 1-19.

* cited by examiner

SCALABLE SPECIFICATION OF PAGE FLOWS

FIELD OF THE INVENTION

The present invention relates generally to web applications, and more particularly, but not exclusively, to specifying a customized flow of pages for an interactive web application.

BACKGROUND OF THE INVENTION

Designing complex interactive web applications generally requires some means for organizing the flow of pages that will be sent from a web server to a web client under particular conditions. Electronic commerce is one setting in which page flow organization is particularly important. A provider or operator of an online store may wish to structure the experiences of an online shopper who is browsing products, placing product items in a shopping cart, and ordering the items in a checkout phase.

Hypertext Transfer Protocol (HTTP) itself does not provide a suitable model for controlling page flow, as it is a stateless protocol in which the server acts by responding to incoming requests from the client. A traditional technique for describing page transitions in web applications is to model the application using a finite state machine. In accordance with such a model, a web application typically has multiple states and is in one state at a time. A transition to a new state may include sending a web page to the client browser. Finite state machines generally provide a scalable means for expressing page flow. However, state machine representations provide a low level of abstraction, tend to be unreadable for complex interactive applications, and are inconvenient to use and maintain.

An alternative approach to expressing page flows is to use a construct known as continuations. A continuation represents the future of a computation at a particular point in program execution. In the web server context, a continuation can be used to allow suspended processing to be restored after a client response is received. Continuations are generally convenient to use, enabling the complexities of page content flow to be modeled at a higher level of abstraction in a manner similar to a simple procedural program. However, in existing implementations of page flow description tools, continuations tend to be very expensive in consumption of computing resources, primarily because they make use of the underlying programming language to save and restore the state of the stack for the executing program.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein.

DETAILED DESCRIPTION OF THE INVENTION

The present invention will now be described more fully hereinafter with reference to the accompanying drawings, which form a part hereof, and which show, by way of illustration, specific exemplary embodiments by which the invention may be practiced. This invention may, however, be embodied in many different forms and should not be regarded as limited to the embodiments set forth herein; rather, these embodiments are provided so that this disclosure will be thorough and complete and will convey fully the scope of the invention to those skilled in the art. The following detailed description is, therefore, not to be taken in a limiting sense.

Overview of the Invention

The present invention is directed towards a system, method, and apparatus for specifying a customized flow of pages for an interactive web application. In accordance with the invention, execution of page flows is differentiated from other aspects of execution, including the actions associated with particular points in the page flow. A continuation is employed for every interaction that requires waiting for an indeterminate amount of time for user input. In a conventional implementation of continuations, the entire control stack and all local variables are saved and restored. The present invention employs a separate, relatively small stack to save information relating to page flow. In one embodiment, and for a typical application, this page flow stack may be on the order of tens of bytes rather than several kilobytes in size.

The present invention permits greater selectivity regarding what is saved and restored, because the stack and local variables are explicit. In particular, for each continuation, if stack contents are predictable in advance because there are no local variables specific to that instance of the flow, compression can be achieved. Moreover, even where there are local variables specific to a flow, a compact representation of the stack itself is generally possible. However, such a representation may additionally include information regarding the local variables, so that the full stack can be reconstructed.

In one embodiment, page flows are describable by way of calls to a library, such as a library implemented using C++ or another programming language. These calls may be used within a program for processing page flow. While the invention is applicable to any kind of page flow, in one embodiment the invention may be employed for expressing page flows associated with an online shopper's entry into a checkout phase, in which the shopper orders items that have been placed in a virtual shopping cart. In another embodiment, the invention may be used by an online store operator to define various kinds of common page flows that may then be provided to third-party merchants for use in customizing their store sites. For example, particular page flows might be specified for particular products purchased, particular classes of customers, particular shopping seasons, and particular bandwidth conditions (slow connections or fast connections), and the like.

Illustrative Operating Environment

Figure 1:
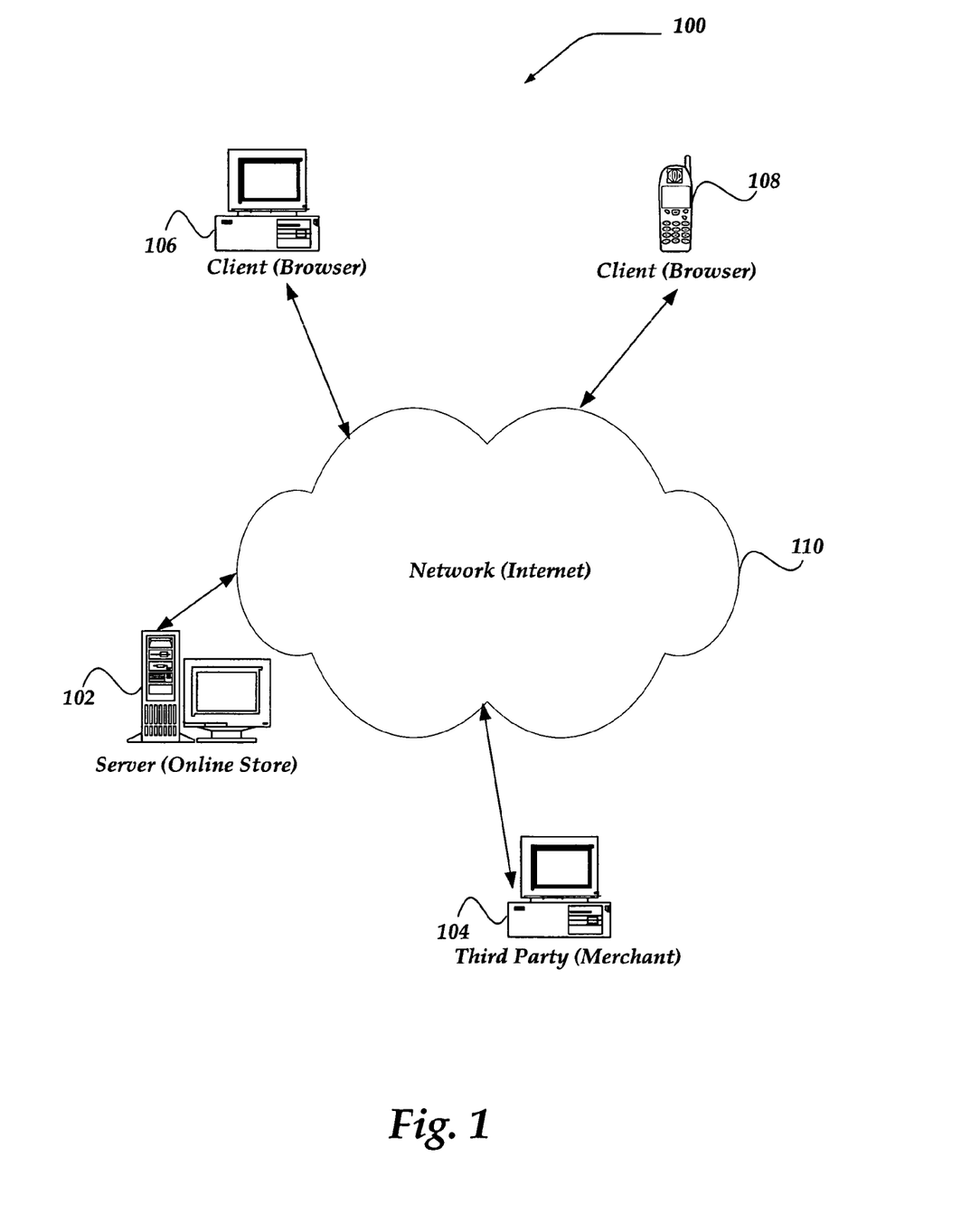
FIG. 1 is a functional block diagram illustrating one embodiment of an environment for practicing the invention.

FIG. 1 illustrates one embodiment of an environment in which the present invention may operate. Not all of these components may be required to practice the invention, and variations in the arrangement and type of the components may be made without departing from the spirit or scope of the invention. The illustrated environment includes one suitable for use as an online shopping system that includes an operator of an online store associated with a third-party merchant. However, the invention is also applicable to other environments, including environments in which a merchant operates an online store, as well as environments not involving online shopping services or other forms of electronic commerce, such as interactive and/or informational websites.

As illustrated in FIG. 1, system 100 includes computing devices 102-108 coupled to and capable of communicating with one another across network 110. Computing devices 102-108 include server 102 used in operating an online store, a computing device operated by a third-party 104 with respect to the operator of the online store, such as a third-party merchant, and clients 106-108 configured to run browser applications 106-108. Clients 106-108 include, for example, personal computer 106 running a web browser application, and web-enabled mobile device 108. Server 102 runs a web server application and related applications, such as an application for controlling the flow of pages served by server 102. Typically, server 102 is coupled to other devices that perform related or specialized tasks and that may also be coupled to network 110.

Computing devices 102-108 may each include virtually any device that is configured to perform computation and that is capable of sending and receiving data communications by way of one or more wired and/or wireless communication interfaces. Devices 102-108 may be configured to communicate using any of a variety of network protocols. For example, server 102 may be configured to execute a web server application that employs a protocol such as HTTP to communicate information, such as a web page, across network 110 to client 106. Client 106 is configured to execute a browser application that employs HTTP to request information from server 102 and then displays the retrieved information to a user. Computing devices 102-108 may generally include server computers, personal computers, desktop computers, handheld computers, mobile computers, workstations, personal digital assistants, programmable consumer electronics, mobile devices, and the like.

Network 110 is configured to couple one computing device to another computing device to enable them to communicate data. Network 110 is enabled to employ any form of computer-readable media for communicating information from one electronic device to another. Network 110 may include one or more of a wireless network, a wired network, a local area network (LAN), a wide area network (WAN), a direct connection such as through a Universal Serial Bus (USB) port, and the like, and may include the set of interconnected networks that make up the Internet. On an interconnected set of LANs, including those based on differing protocols, a router acts as a link between LANs, enabling messages to be sent from one to another. Communication links within LANs typically include twisted wire pair or coaxial cable. Communication links between networks may generally utilize analog telephone lines, full or fractional dedicated digital lines including T1, T2, T3, and T4, Integrated Services Digital Networks (ISDNs), Digital Subscriber Lines (DSLs), wireless links including satellite links, or other communication links known to those skilled in the art. Remote computers and other electronic devices may be remotely connected to LANs or WANs by way of a modem and temporary telephone link. In essence, network 110 may include any communication method by which information may travel between computing devices.

The media used to transmit information across communication links as described above illustrate one type of computer-readable media, namely communication media. Generally, computer-readable media include any media that can be accessed by a computing device. Computer-readable media may include computer storage media, network communication media, and the like. Moreover, communication media typically embody information comprising computer-readable instructions, data structures, program components, or other data in a modulated data signal such as a carrier wave, data signal, or other transport mechanism, and such media include any information delivery media. The terms "modulated data signal" and "carrier-wave signal" include a signal that has one or more of its characteristics set or changed in such a manner as to encode information, instructions, data, and the like, in the signal. By way of example, communication media include wired media such as twisted pair, coaxial cable, fiber optic cable, and other wired media, and wireless media such as acoustic, RF, infrared, and other wireless media.

Illustrative Computing Device

Figure 2:
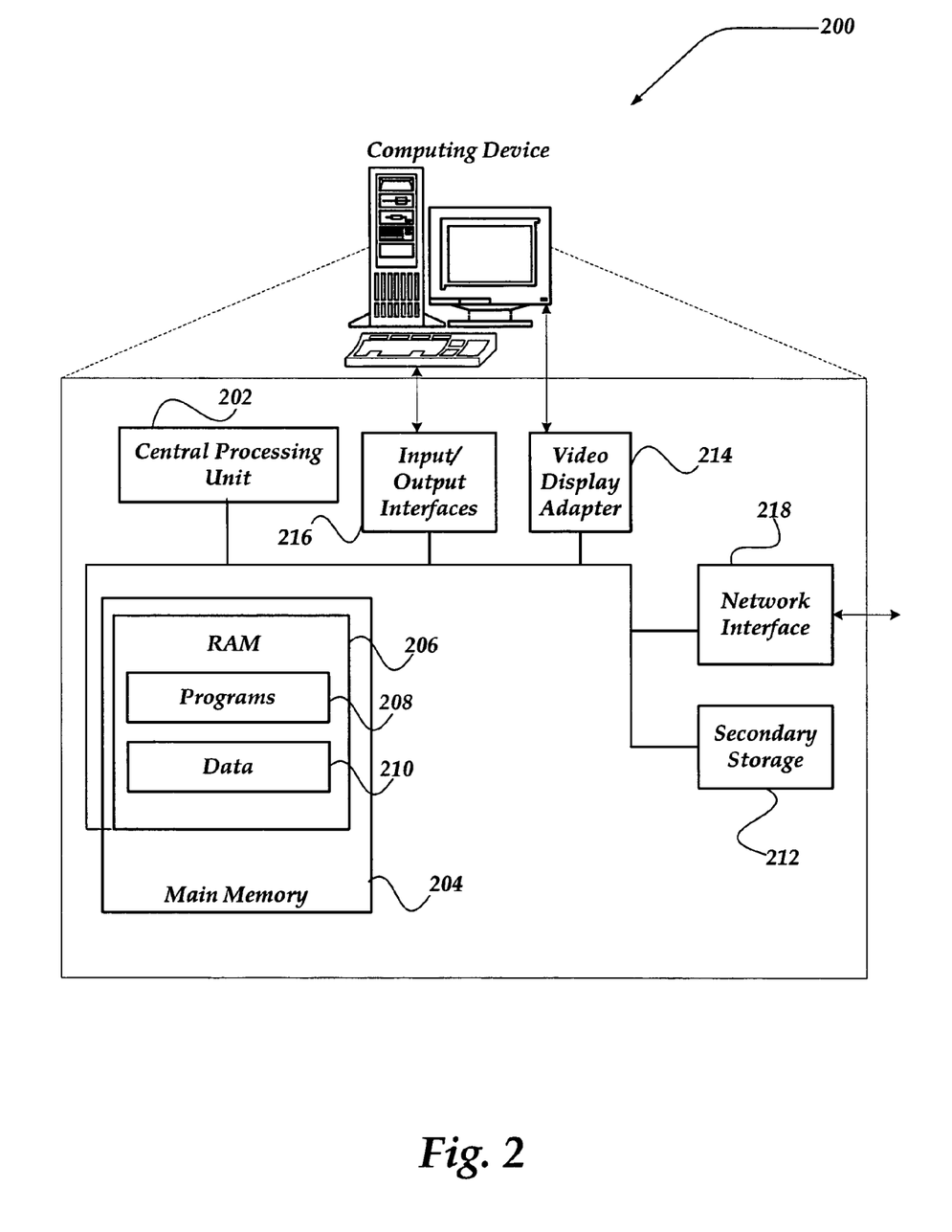
FIG. 2 illustrates one embodiment of a computing device that may be employed for various purposes in a system implementing the invention.

FIG. 2 shows one embodiment of a computing device 200 suitable for use as a client device, a server device, or another kind of computing device, such as, for example, clients 106-108, server 102, and third-party-operated computing device 104 of FIG. 1, in a system implementing the invention. Device 200 may include many more or fewer components than those shown in FIG. 2, as for example if device 200 represents a mobile device such as client 108. However, the components shown are sufficient to disclose an illustrative embodiment for practicing the present invention. The details of such devices are rudimentary to those having skill in the art and need not be described at length here.

As shown in FIG. 2, device 200 includes a central processing unit 202 in communication with a main memory 204. Main memory 204 may include RAM 206, ROM (not shown), and other storage means. Device 200 also typically includes at least one secondary storage device 212 such as a magnetic disk, an optical disk, and the like, for nonvolatile storage. Main memory 204 and secondary storage device 212 illustrate another example of computer-readable media for storage of information such as computer-executable instructions, data structures, program components, and other data.

Device 200 further includes a video display adapter 214 for communication with a display, and other input/output interfaces 216 for communicating with other peripheral input/output devices, such as a mouse, keyboard, or other such devices. Device 200 also includes network interface 218. By way of network interface 218, device 200 may be coupled to one or more networks, such as network 110 of FIG. 1, and network interface 218 is configured for use with one or more network protocols and technologies including, but not limited to, the TCP/IP protocol suite and various protocols residing below and above the TCP/IP protocol suite.

Main memory 204 is suitable for use in storing computer-executable programs 208 and computer-readable data 210.

For example, main memory 204 may store data packets that are formatted in accordance with one or more network protocols and that are sent to or received from another computing device by way of network interface 218, and main memory 204 may store data comprising the data contents of a web page encoded in a markup language such as Hypertext Markup Language (HTML). Main memory 204 stores programs 208 which include computer-executable instructions. Such programs include an operating system, programs that enable network communication by way of network interface 218, programs associated with a web server or a web client, programs that visually render web pages, such as a web browser client application, programs that execute or interpret scripts used in rendering interactive web pages, and the like. For example, device 200 may be a server device that executes an HTTP server application for receiving and handling HTTP requests.

Page Customization Framework

Figure 3:
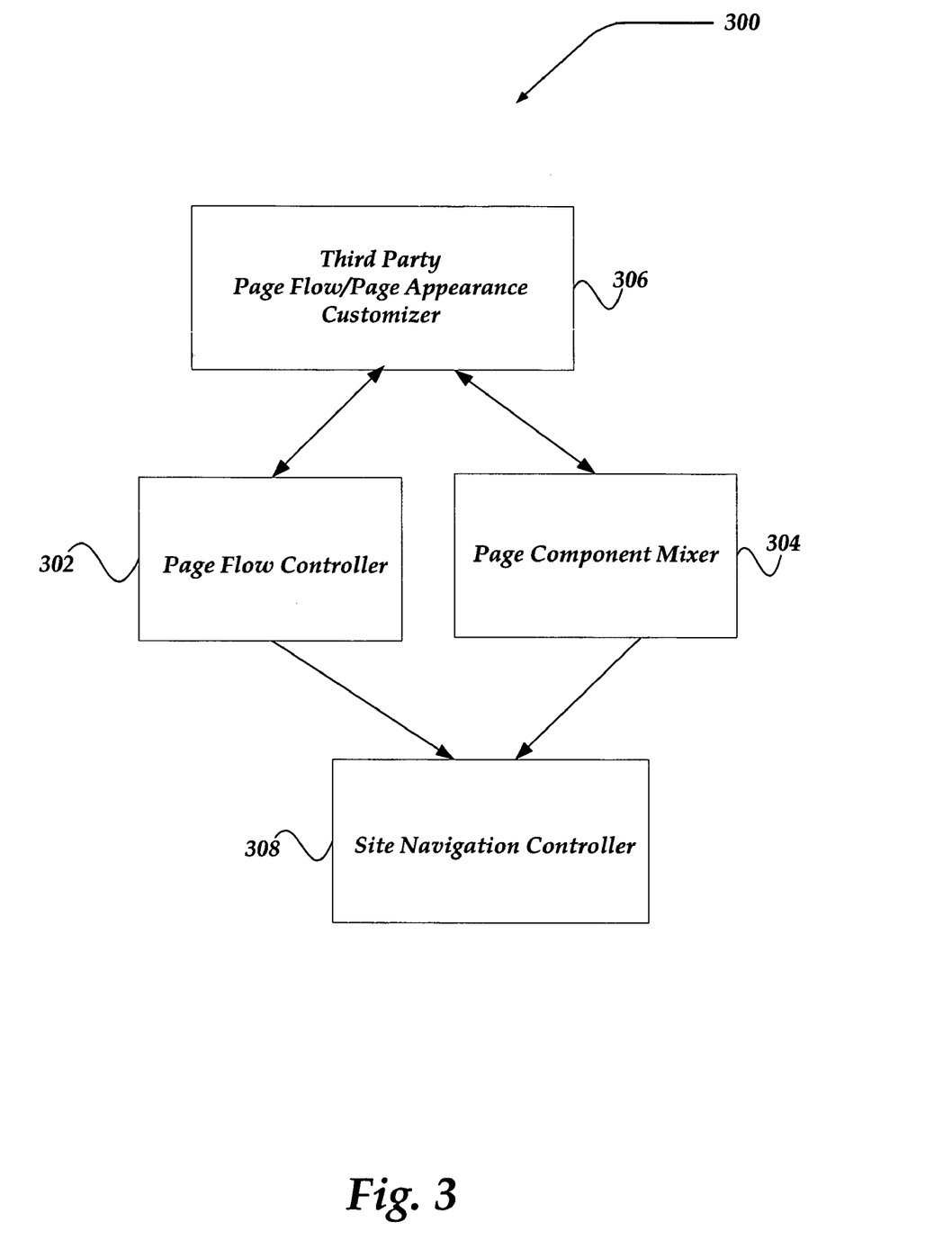
FIG. 3 is a block diagram illustrating elements of a framework for customization of page flow and page appearance, including third-party customization.

FIG. 3 is a diagram illustrating elements of a simplified framework 300 for customization of web page flow and web page. Framework 300 may be used in an electronic commerce setting in which the operator of an online store is distinct from a third-party merchant whose items are sold by way of the online store. Other applications of framework 300 and similar frameworks are encompassed by the present invention, including one in which a merchant is also the operator of the online store, and including non-commercial interactive and/or informational website applications. In the illustrated framework, an online store operator and a third-party merchant may customize aspects of the online shopping experience for users, including the appearance and flow of web pages served to the users, such as the web pages served in displaying the user's shopping cart and the web pages served during the online checkout process.

Framework 300 includes page flow controller 302 and page component mixer 304. Page flow controller 302 and page component mixer 304 include processes performed by the online store operator. Page flow controller 302 and page component mixer 304 interact with third party page flow/page appearance customizer 306, which includes processes performed by a third party merchant.

Third party page flow/page appearance customizer 306 may include a set of configuration tools or website design interfaces provided to the third party merchant by the online store operator. Such tools or interfaces permit the third party to customize the appearance and flow of pages for a site and to communicate the customizations back to page flow controller 302 and page component mixer 304 at the online store operator. Customized pages and page flow for a website, such as an online store, are then provided to site navigation controller 308, which handles the serving of customized pages to users (online shoppers) in accordance with the specified and customized page flow.

Third party page flow/page appearance customizer 306 may refine predefined customization options or templates generated at page flow controller 302 and page component mixer 304 and provided to third party page flow/page appearance customizer 306. For example, with respect to page flows, the third party may be presented with options for choosing single-page checkout in which the user sees only one checkout page, multiple page checkout in which separate shipping and billing pages are displayed to the user, and multiple page checkout in which separate shipping, billing, and order review pages are displayed to the user.

Page flow controller 302 employs a technique for specifying page flows using continuations, as described in further detail above and below. Page component mixer 304 is generally used for designing the appearance of pages that are ultimately served to users. Page component mixer 304 enables separate compilation of pages for third party page flow/page appearance customizer 306 and site navigation controller 308. Pages are assembled for third party page flow/page appearance customizer 306 in such a way that components used to customize the appearance of the pages are included dynamically, which facilitates the page design process. Page component mixer 304 analyzes the customized pages to determine which components may remain dynamic and which components can ultimately be included statically rather than dynamically when the pages are served by site navigation controller 308 to allow efficient and scalable delivery of pages to the user. For example, page component mixer 304 may determine that relatively complex components made up of several subcomponents, such as the display of a coupon in a page, should ultimately be statically generated so that the subcomponents need not be assembled each time the page is served to a user by site navigation controller 308.

Page Flow Continuation Stack

Figure 4:
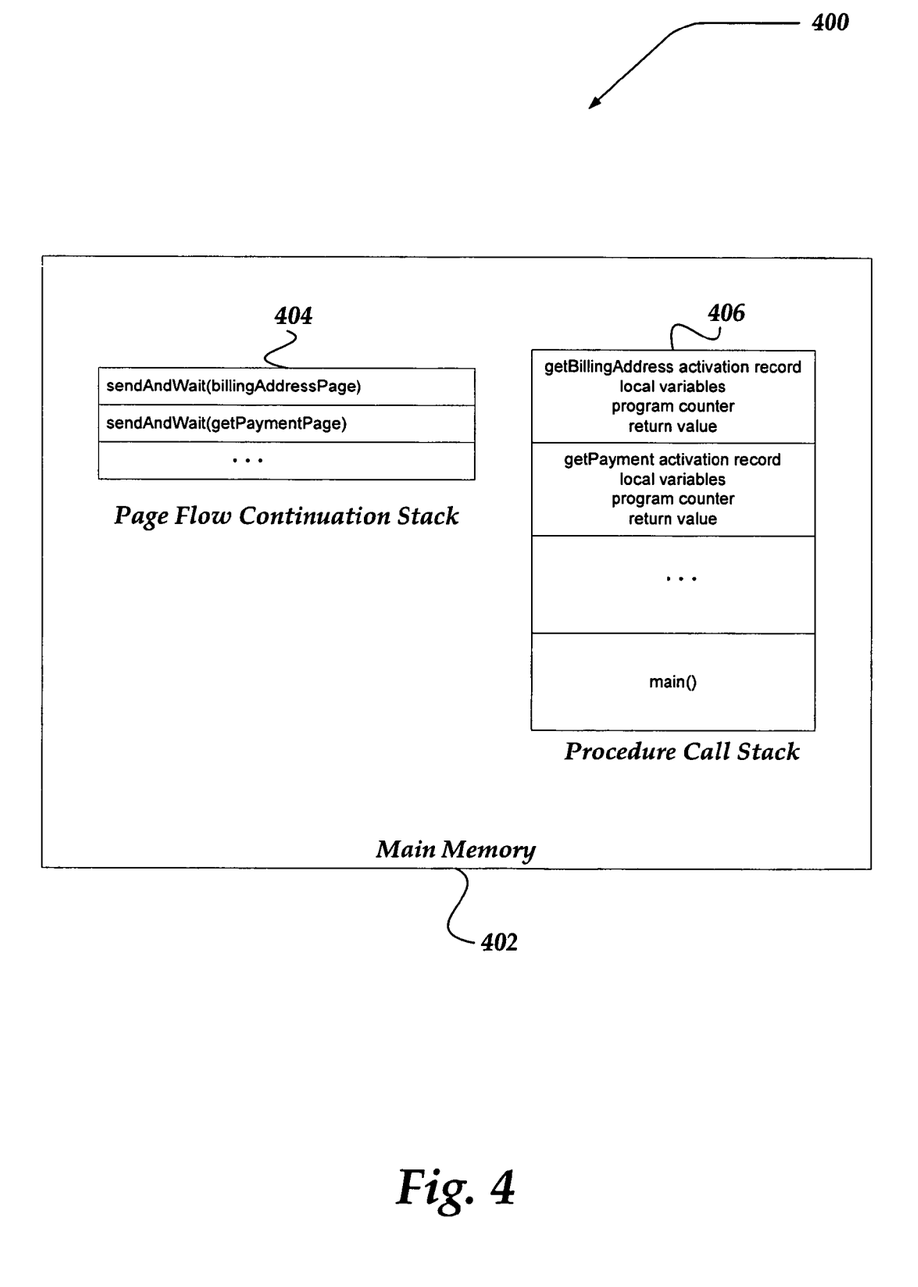
FIG. 4 is a diagram illustrating the use of a page flow continuation stack that is distinct from a procedure call stack.

FIG. 4 is a diagram illustrating the use of a relatively small page flow continuation stack 404 that is distinct from a relatively large procedure call stack 406, both of which are stored in main memory 402. In a page flow specification for a set of pages to be served to a user, continuations are employed at each interaction point in the flow in which processing is suspended while waiting for an indeterminate period of time for input from the user, after which the state associated with the continuation is restored and processing is resumed.

Conventionally, a continuation is implemented by copying the entire contents of the runtime procedure call stack. When processing is suspended, the entire stack and all local variables are saved and are restored on resumption of processing. The present invention instead implements each continuation by generating and maintaining page flow continuation stack 404, the contents of which are generally limited to information needed to keep track of the page flow, unlike procedure call stack 406, each frame of which is a full activation record that includes local variables, program counter values, return values, and the like. While procedure call stack 406 extends from the beginning of the running program to a current point, in the present invention, page flow continuation stack 404 is limited to the beginning of the flow, not the program as a whole. Greater selectivity regarding what is saved and restored is enabled, because the stack and local variables are explicit.

Generalized Operation

Figure 5:
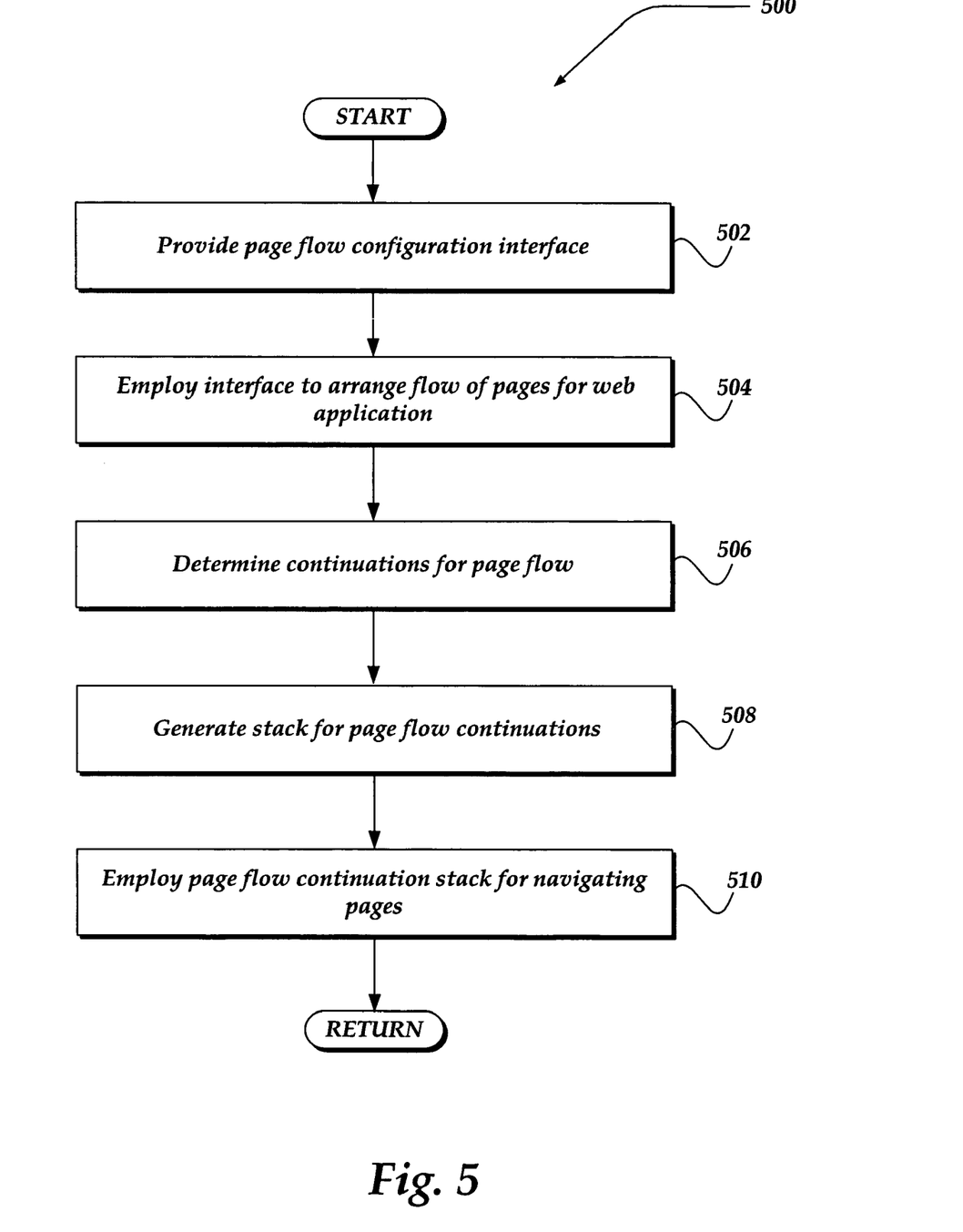
FIG. 5 illustrates a logical flow diagram generally showing an overview of one embodiment of a process for configuring and implementing a page flow.

The operation of certain aspects of the invention will now be described with respect to FIGS. 5-8. FIG. 5 is a logical flow diagram generally showing one embodiment of an overview process 500 for configuring and implementing a page flow for a set of pages to be served to a user in an interactive web application. Process 500 begins, after a start block, at block 502, where a page flow configuration interface is provided, for example to a third party merchant for customization of page flow for online store checkout pages. Next, at block 504, the interface is employed to specify an arrangement of a flow of pages for the web application. As noted above in reference to FIG. 3, the arrangement of page flow may include selecting from and customizing a set of predefined page flow options or templates. Process 500 then flows to block 506, at which required continuations for the page flow are determined. For example, a point in the page flow in which a page requests information from the user corresponds to a continuation. Next, processing flows to block 508, where, in the course of serving pages to the user, a stack for page flow continuations is generated for each continuation in the flow. At block 510 the page flow continuation stack is employed to enable the user to navigate pages. For example, if serving of pages is suspended while waiting for user input, when the input is received from the user, the page flow continuation stack is used to restore the state of the page flow and enable page flow processing to resume. Process 500 then returns to perform other actions.

Figure 6:
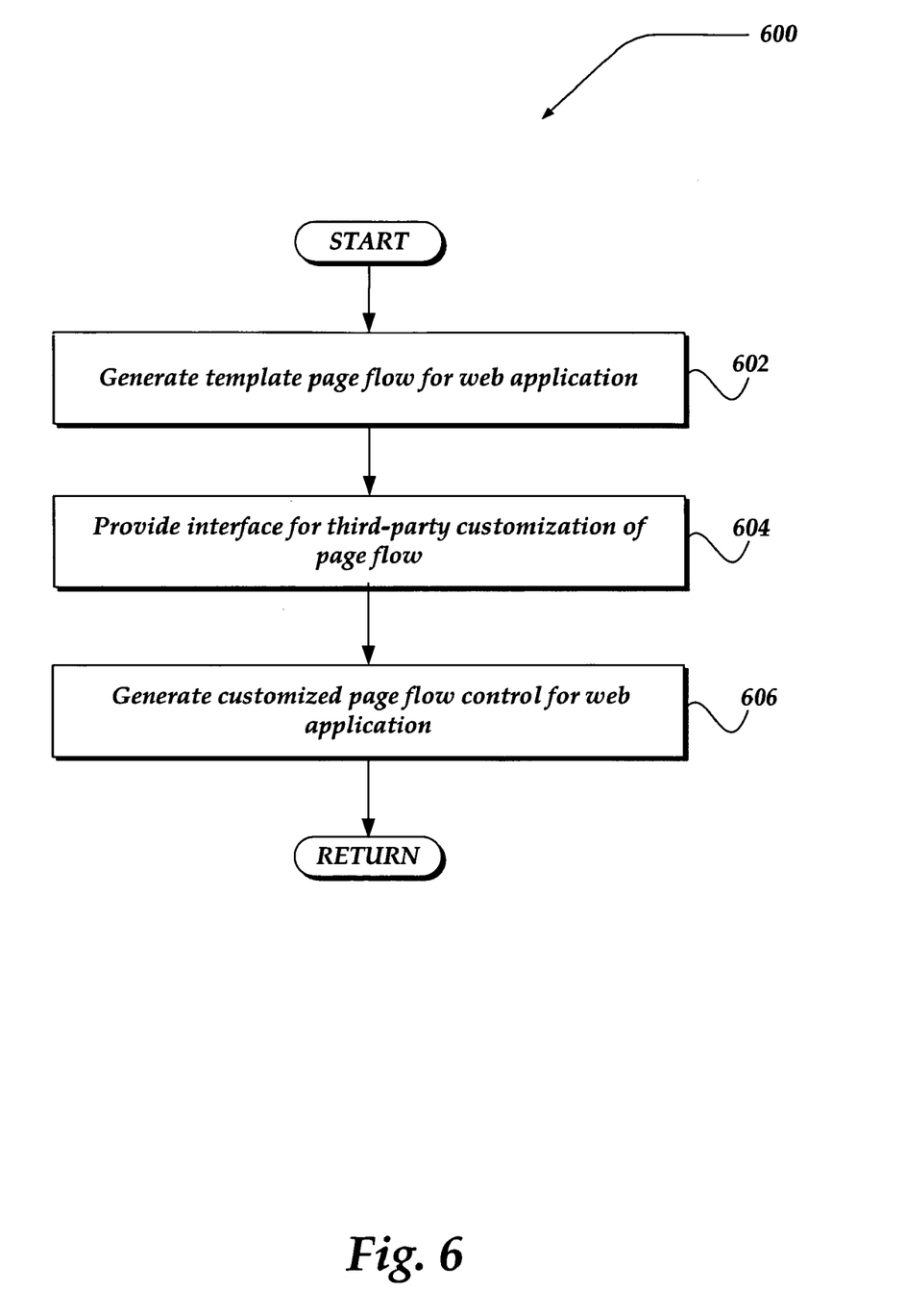
FIG. 6 illustrates a logical flow diagram generally showing one embodiment of a process for generating a customized page flow.

FIGS. 6-8 generally provide greater detail regarding aspects of the process illustrated in FIG. 5. FIG. 6 is a logical flow diagram generally showing one embodiment of a process 600 for generating a customized page flow. After a start block, process 600 flows to block 602, where a template page flow is generated for the web application. Next, at block 604, an interface for customization of the template page flow is provided to a third party. Process 600 then steps to block 606, at which a page flow control for the web application is generated in accordance with the initial template and the customization performed by the third party. Processing then flows to a return block.

Figure 7:
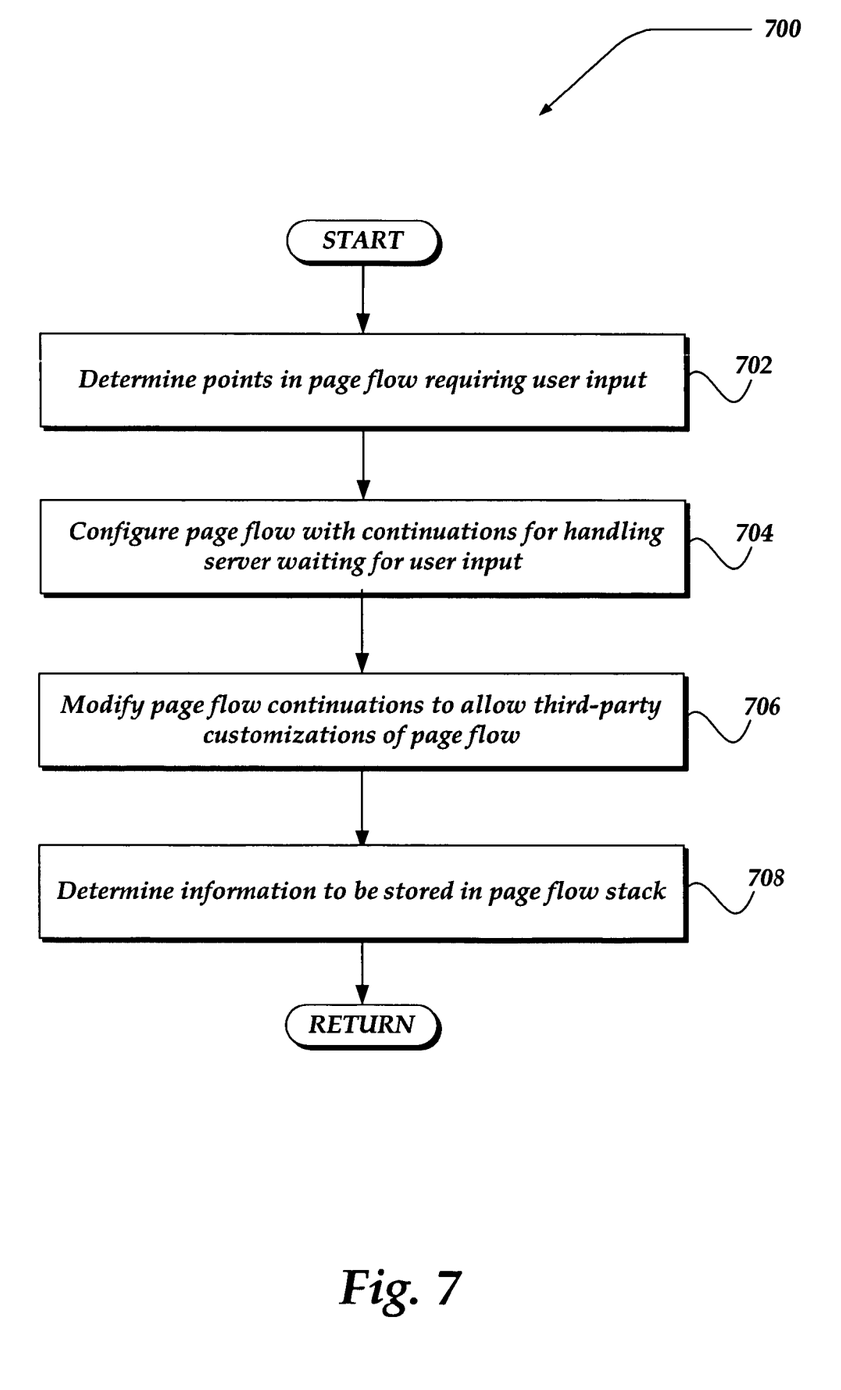
FIG. 7 illustrates a logical flow diagram generally showing one embodiment of a process for configuring a page flow specification with continuations.

FIG. 7 is a logical flow diagram generally showing one embodiment of a process 700 for configuring a page flow specification with continuations. Following a start block, process 700 steps to block 702, at which the points in the page flow requiring user input are determined. Next, at block 704, the page flow specification is configured with continuations at the points at which the web server waits to receive information from the user. Process 700 then flows to block 706, where the set of continuations in the page flow is modified in accordance with customizations and modifications of the page flow performed by a third party. At block 708 the information to be stored in the page flow continuation stack for each continuation may be determined, generally enabling a more compressed representation of the page flow. Process 700 then returns to perform other actions.

Figure 8:
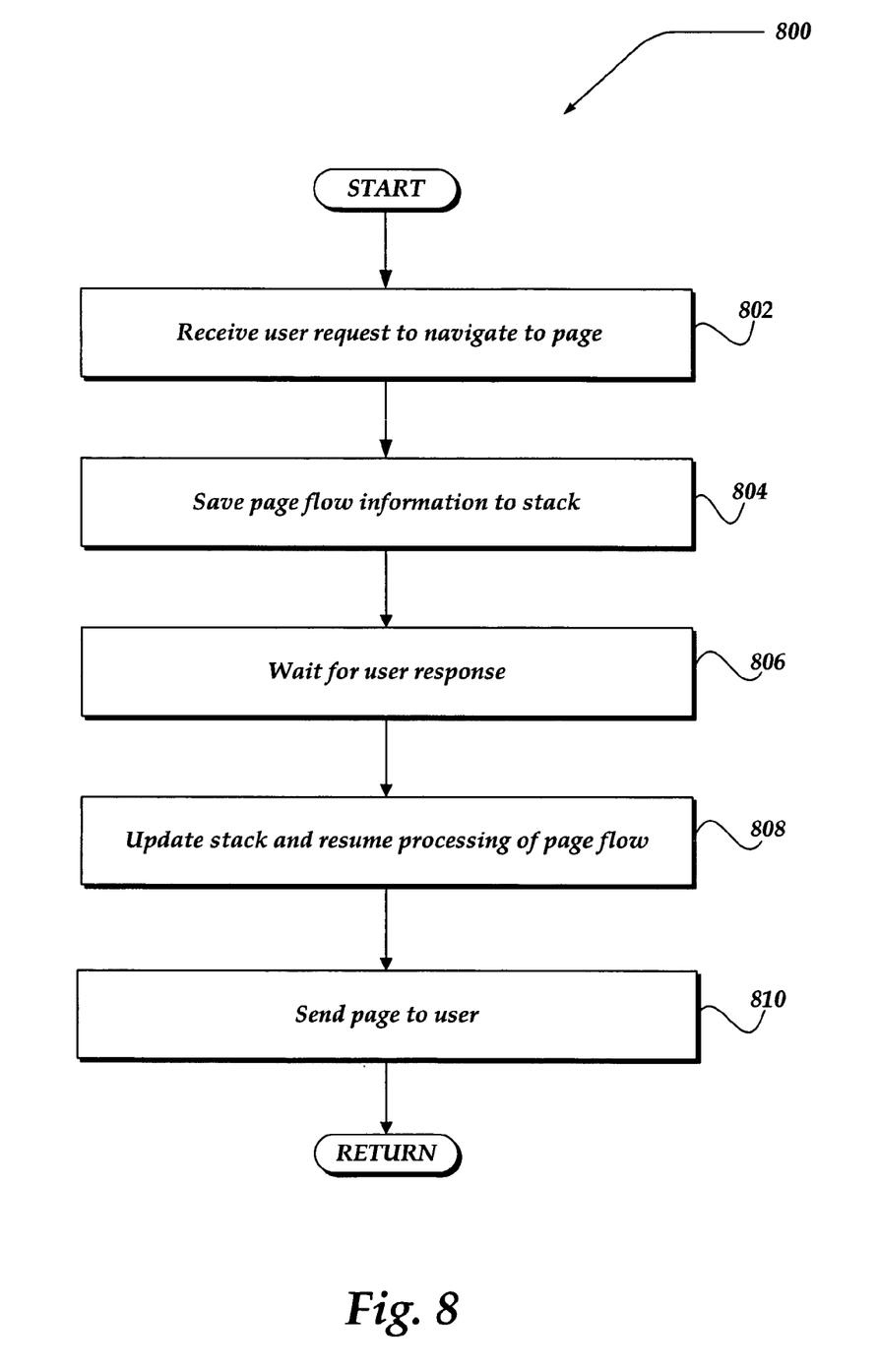
FIG. 8 illustrates a logical flow diagram generally showing one embodiment of a process for controlling a page flow for a user of an interactive web application, in accordance with the present invention.

FIG. 8 is a logical flow diagram generally showing one embodiment of a process 800 for controlling a page flow for a user of an interactive web application. Following a start block, process 800 flows to block 802, where a server receives a user request to navigate to a page or section of a page. Process 800 then flows to block 804, where page flow information is saved to a page flow continuation stack. For the first page in a flow, there is a null continuation, and for the remainder of the flow there is a continuation for every user interaction. Next, at block 806, the page flow is suspended while waiting for a response from the user. At block 808, when the response is received from the user, the page flow continuation stack is updated and restored, and processing of the page flow is resumed. At block 810 a page is sent to the user in accordance with the page flow. Process 800 then returns to perform other actions.

The above specification provides a complete description of the manufacture and use of the composition of the invention. Since many embodiments of the invention can be made without departing from the spirit and scope of the invention, the invention resides in the claims hereinafter appended.

What is claimed as new and desired to be protected by Letters Patent of the United States is:

1. A method for controlling navigation of a plurality of web pages for an interactive application, comprising:
    generating a page flow continuation for a transition from a first web page to a second web page of the plurality of web pages, wherein the transition is based on an input by a user;
    generating a first stack associated with a flow of pages for the page flow continuation, wherein the first stack is separate from a second stack that is also generated for the page flow continuation for at least one action associated with at least one point in the flow pages, and wherein the second stack is a procedure call stack; and
    if the user provides the input, resuming the page flow continuation associated with the first stack to enable navigation to a second web page.

2. The method of claim 1, further comprising:
    generating distinct stacks to represent page flow continuations that are separate from a control stack for a web server.

3. The method of claim 1, further comprising:
    using a compressed representation of at least a part of the page flow continuation.

4. The method of claim 1, wherein the web pages include web pages for an online store.

5. The method of claim 4, wherein the web pages includes web pages for a product checkout for the online store.

6. The method of claim 1, further comprising:
    enabling customization of a navigation flow of the web pages by a third party.

7. The method of claim 1, further comprising:
    enabling customization of a navigation flow of the web pages according to at least one of the following: product, customer, season, number of checkout pages, and bandwidth condition.

8. A computer-readable medium having executable instructions for performing a method for controlling navigation of a plurality of web pages for an interactive application, comprising:
    generating a page flow continuation for a transition from a first web page to a second web page, wherein the transition is based on an input by a user;
    generating a first stack associated with a flow of pages for the page flow continuation, wherein the first stack is separate from a second stack that is also generated for the page flow continuation for at least one action associated with at least one point in the flow of pages, and wherein the second stack is a procedure call stack; and
    if the user provides the input, resuming the page flow continuation associated with the first stack to enable navigation to a second web page.

9. A server for controlling navigation of a plurality of web pages for an interactive application, comprising:
    a network interface;
    a processor in communication with the network interface; and
    a memory in communication with the processor and storing machine instructions for performing actions, including:
        generating a page flow continuation for a transition from a first web page to a second web page, wherein the transition is based on an input by a user;
        generating a first stack associated with a flow of pages for the page flow continuation, wherein the first stack is separate from a second stack that is also generated for the page flow continuation for at least one action associated with at least one point in the flow of pages, and wherein the second stack is a procedure call stack; and
        if the user provides the input, resuming the page flow continuation associated with the first stack to enable navigation to a second web page.

10. The server of claim 9, further comprising:
    generating distinct stacks to represent page flow continuations that are separate from a control stack for the server.

11. The server of claim 9, wherein the web pages include web pages for an online store.

12. The server of claim 9, wherein the web pages includes web pages for a product checkout for the online store.

13. The server of claim 9, wherein the actions further include enabling customization of a navigation flow of the web pages by a third party.

14. A client for controlling navigation of a plurality of web pages for an interactive application, comprising:
   a network interface;
   a processor in communication with the network interface; and
   a memory in communication with the processor and storing machine instructions for performing actions, including:
      generating a page flow continuation for a transition from a first web page to a second web page, wherein the transition is based on an input by a user;
      generating a first stack associated with a flow of pages for the page flow continuation, wherein the first stack is separate from a second stack that is also generated for the page flow continuation for at least one action associated with at least one point in the flow of pages, and wherein the second stack is a procedure call stack; and
      if the user provides the input, resuming the page flow continuation associated with the first stack to enable navigation to a second web page.

15. The client of claim 14, further comprising:
   generating distinct stacks to represent page flow continuations that are separate from a control stack.

16. The client of claim 14, wherein the web pages include web pages for an online store.

17. The client of claim 14, wherein the web pages includes web pages for a product checkout for the online store.

18. The client of claim 14, wherein the actions further include enabling customization of a navigation flow of the web pages by a third party.

19. A computer-readable medium having stored thereon a data structure for controlling navigation of a plurality of web pages for an interactive application, comprising:
   a page flow stack associated with a page flow continuation for a transition from a first web page to a second web page, wherein the page flow stack is employed to resume the page flow continuation after an input is received from a user; and
   a procedure call stack associated with the page flow continuation for at least one action associated with at least one point in a flow of pages controlled by the page flow stack.

20. The computer-readable medium of claim 19, wherein the page flow stack is separate from a procedure call stack.

21. The computer-readable medium of claim 19, wherein the web pages include web pages for an online store.

22. The computer-readable medium of claim 19, wherein the web pages includes web pages for a product checkout for the online store.

* * * * *

UNITED STATES PATENT AND TRADEMARK OFFICE
CERTIFICATE OF CORRECTION

PATENT NO. : 7,584,267 B2
APPLICATION NO. : 11/209399
DATED : September 1, 2009
INVENTOR(S) : Aamod Sane It is certified that error appears in the above-identified patent and that said Letters Patent is hereby corrected as shown below:

In column 8, line 3, in claim 1, delete "flow" and insert -- flow of --, therefor.

Signed and Sealed this

Twenty-seventh Day of October, 2009

David J. Kappos
*Director of the United States Patent and Trademark Office*

UNITED STATES PATENT AND TRADEMARK OFFICE
CERTIFICATE OF CORRECTION

PATENT NO. : 7,584,267 B2  Page 1 of 1
APPLICATION NO. : 11/209399
DATED : September 1, 2009
INVENTOR(S) : Aamod Sane It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 751 days.

Signed and Sealed this

Fourteenth Day of September, 2010

David J. Kappos
*Director of the United States Patent and Trademark Office*